US011993095B2

(12) United States Patent
Sakamoto et al.

(10) Patent No.: US 11,993,095 B2
(45) Date of Patent: May 28, 2024

(54) HEAT-SENSITIVE RECORDING MATERIAL

(71) Applicant: Oji Holdings Corporation, Tokyo (JP)

(72) Inventors: Kazuyuki Sakamoto, Tokyo (JP); Kentaro Morofuji, Tokyo (JP); Takashi Takemura, Tokyo (JP)

(73) Assignee: OJI HOLDINGS CORPORATION, Tokyo (JP)

(*) Notice: Subject to any disclaimer, the term of this patent is extended or adjusted under 35 U.S.C. 154(b) by 685 days.

(21) Appl. No.: 17/256,437

(22) PCT Filed: Jun. 27, 2019

(86) PCT No.: PCT/JP2019/025639

§ 371 (c)(1),
(2) Date: Dec. 28, 2020

(87) PCT Pub. No.: WO2020/004558

PCT Pub. Date: Jan. 2, 2020

(65) Prior Publication Data

US 2021/0268821 A1 Sep. 2, 2021

(30) Foreign Application Priority Data

Jun. 29, 2018 (JP) ................................ 2018-124356

(51) Int. Cl.

| | |
|---|---|
| ***B41M 5/44*** | (2006.01) |
| ***B41M 5/323*** | (2006.01) |
| ***B41M 5/42*** | (2006.01) |
| *B41M 5/333* | (2006.01) |

(52) U.S. Cl.

CPC .............. *B41M 5/44* (2013.01); *B41M 5/323* (2013.01); *B41M 5/42* (2013.01); *B41M 5/3333* (2013.01); *B41M 5/3335* (2013.01); *B41M 2205/04* (2013.01); *B41M 2205/38* (2013.01)

(58) Field of Classification Search

CPC .. B41M 5/323; B41M 5/3275; B41M 5/3333; B41M 5/3335; B41M 5/42; B41M 5/44; B41M 2205/04; B41M 2205/38

See application file for complete search history.

(56) References Cited

U.S. PATENT DOCUMENTS

| | | | |
|---|---|---|---|
| 4,925,827 | A | 5/1990 | Goto |
| 5,231,068 | A | 7/1993 | Miyamoto et al. |
| 8,349,766 | B2 | 1/2013 | Ohga |
| 2005/0137088 | A1 | 6/2005 | Hayakawa et al. |
| 2010/0062936 | A1 | 3/2010 | Orihara |
| 2011/0092365 | A1 | 4/2011 | Ohga |

FOREIGN PATENT DOCUMENTS

| | | | | | |
|---|---|---|---|---|---|
| JP | 3121359 | B2 | | 8/1992 | |
| JP | H04-220393 | A | | 8/1992 | |
| JP | H05-000573 | A | | 1/1993 | |
| JP | H05-238143 | A | | 9/1993 | |
| JP | H11-058949 | A | | 3/1999 | |
| JP | 2003-145931 | A | | 5/2003 | |
| JP | 2004-202770 | A | | 7/2004 | |
| JP | 2005-199704 | A | | 7/2005 | |
| JP | 2006-062114 | A | | 3/2006 | |
| JP | 2006-273846 | A | | 10/2006 | |
| JP | 2007275872 | A | * | 10/2007 | ............. B41M 5/44 |
| JP | 2009-045857 | A | | 3/2009 | |
| JP | 2009-066897 | A | | 4/2009 | |
| JP | 2010-005895 | A | | 1/2010 | |
| JP | 2011-088324 | A | | 1/2010 | |
| JP | 2015-063053 | A | | 4/2015 | |
| JP | 2016165859 | A | * | 9/2016 | ............. B41M 5/28 |

OTHER PUBLICATIONS

Extended European Search Report for corresponding European Patent Application No. 19826708.0 dated Feb. 23, 2022 (10 sheets).

Office Action of corresponding Chinese Patent Application No. 201980043793.6 dated May 10, 2022 (6 sheets, 8 sheets translation, 14 sheets total).

International Search Report for International Application No. PCT/JP2019/025639 dated Jul. 30, 2019 (3 sheets, 2 sheets translation, 5 sheets total).

* cited by examiner

*Primary Examiner* — Gerard Higgins

(74) *Attorney, Agent, or Firm* — Kratz, Quintos & Hanson, LLP

(57) ABSTRACT

Disclosed is a heat-sensitive recording material comprising an undercoat layer and a heat-sensitive recording layer formed in this order on a support, the undercoat layer containing hollow plastic particles and a binder, the heat-sensitive recording layer containing a leuco dye and a developer, and the heat-sensitive recording material having an elastic modulus of 200 $N/mm^2$ or less as measured by a nanoindentation method.

3 Claims, No Drawings

HEAT-SENSITIVE RECORDING MATERIAL

TECHNICAL FIELD

The present invention relates to a heat-sensitive recording material using a color-forming reaction of a leuco dye and a developer.

BACKGROUND ART

Heat-sensitive recording materials are widely known, which make use of a color-forming reaction of a leuco dye with a developer, which comes into contact with the leuco dye when heated to develop the color of the leuco dye, so that both coloring materials are melted and brought into contact with each other by heating, thus producing a color image. Such heat-sensitive recording materials are relatively inexpensive, and recording devices for these materials are compact and easy to maintain. Therefore, such heat-sensitive recording materials are used as recording media for fax machines, printers, and other applications in a wide variety of fields.

However, with the expansion of applications, the required performance and quality are diversifying. For example, there is demand for a heat-sensitive recording material that has high image quality without generating white spots and has high sensitivity in a medium energy range.

As a method for obtaining a clear recorded image with good dot reproducibility, there has been proposed a method comprising forming an elastic layer between a support and a heat-sensitive coloring layer whereby the obtained heat-sensitive recording material has a hardness of 90 or less as measured with a type C hardness tester according to JIS K6301 (Patent Literature (PTL) 1).

CITATION LIST

Patent Literature

PTL 1: Japanese Patent No. 3121359

SUMMARY OF INVENTION

Technical Problem

An object of the present invention is to provide a heat-sensitive recording material that provides a high-quality and clear printed image with few image defects, high sensitivity, and excellent medium energy development density.

Solution to Problem

Until now, it has not been proposed to specify a heat-sensitive recording material in terms of cushioning properties, which significantly influence image quality. Accordingly, the present inventors used the "elastic modulus" as a physical property value for evaluating cushioning properties. As stated above, Patent Literature (PTL) 1 merely proposes to specify the hardness of a heat-sensitive recording material.

The present inventors conducted extensive research to achieve the above object. As a result, they found that the object can be achieved by forming an undercoat layer containing hollow plastic particles whereby the obtained heat-sensitive recording material has an elastic modulus of 200 $N/mm^2$ or less as measured by a nanoindentation method. The present invention has been thus accomplished. Specifically, the invention provides the following heat-sensitive recording materials.

Item 1. A heat-sensitive recording material comprising an undercoat layer and a heat-sensitive recording layer formed in this order on a support, the undercoat layer containing hollow plastic particles and a binder, the heat-sensitive recording layer containing a leuco dye and a developer, and the heat-sensitive recording material having an elastic modulus of 200 $N/mm^2$ or less as measured by a nanoindentation method.

Item 2. The heat-sensitive recording material according to Item 1, wherein the undercoat layer contains hollow plastic particles having an average particle diameter of 5.0 μm or more.

Item 3: The heat-sensitive recording material according to Item 2, wherein the undercoat layer contains the hollow plastic particles having an average particle diameter of 5.0 μm or more in a proportion of 50 mass % or less, based on the total solids content of the undercoat layer.

Item 4: The heat-sensitive recording material according to Item 2, wherein the undercoat layer contains the hollow plastic particles having an average particle diameter of 5.0 μm or more in a proportion of 30 mass % or less, based on the total solids content of the undercoat layer.

Item 5: The heat-sensitive recording material according to any one of Items 1 to 4, wherein the undercoat layer contains a binder having a glass transition temperature of −10° C. or less.

Item 6: The heat-sensitive recording material according to any one of Items 1 to 5, wherein the binder in the undercoat layer contains latex.

Item 7: The heat-sensitive recording material according to Item 6, wherein the undercoat layer contains the latex in a proportion of 25 mass % or more, based on the total solids content of the undercoat layer.

Advantageous Effects of Invention

The heat-sensitive recording material according to the present invention provides a high-quality and clear printed image with few image defects (white spots), has high sensitivity, and is excellent in medium energy development density.

DESCRIPTION OF EMBODIMENTS

In the present specification, the expression "comprise" or "contain" includes the concepts of comprising, consisting essentially of, and consisting of.

The "average particle diameter" in the present invention refers to a median diameter based on volume as measured by laser diffractiometry. More simply, the average particle diameter may be shown according to the average value of particle diameters of 10 particles, the particle diameters being measured from the image of each particle with an electron microscope (SEM image).

The present invention is directed to a heat-sensitive recording material characterized in that the heat-sensitive recording material comprises an undercoat layer and a heat-sensitive recording layer formed in this order on a support; the undercoat layer contains hollow plastic particles and a binder; the heat-sensitive recording layer contains a leuco dye and a developer; and the heat-sensitive recording material has an elastic modulus of 200 $N/mm^2$ or less as measured by a nanoindentation method.

Support

The support in the present invention is not particularly limited in type, shape, dimension, or the like. For example, high-quality paper (acid paper, neutral paper), medium-quality paper, coated paper, art paper, cast-coated paper, glassine paper, resin laminate paper, polyolefin synthetic paper, synthetic fiber paper, nonwoven fabrics, synthetic resin films, various transparent supports, or the like, can be appropriately selected and used. The thickness of the support is not particularly limited, and is usually about 20 to 200 μm. The density of the support is not particularly limited, and is preferably about 0.60 to 0.85 $g/cm^3$.

Undercoat Layer

The heat-sensitive recording material of the present invention comprises an undercoat layer between a support and a heat-sensitive recording layer, and the undercoat layer contains hollow plastic particles and a binder. This can increase recording sensitivity. Further, the presence of the hollow plastic particles enhances cushioning properties, whereby printed images become clearer and the medium energy development density can be increased.

Examples of the hollow plastic particles include conventionally known hollow plastic particles, such as particles having a hollow ratio of about 50 to 99% and comprising, as a film material, a polymer having a crosslinked structure, such as an acrylic resin (e.g., an acrylic resin containing acrylonitrile as a component), a styrene resin, a vinylidene chloride resin, or the like. The "hollow ratio" referred to herein is a value obtained according to the following formula: $(d/D)\times100$. In the formula, d represents the inner diameter of the hollow plastic particles, and D represents the outer diameter of the hollow plastic particles. The hollow plastic particles preferably have an average particle diameter of about 5.0 μm or more, more preferably about 6 μm or more, and even more preferably 6 to 9 μm. When the average particle diameter is 5.0 μm or more, the undercoat layer has enhanced cushioning properties whereby the elastic modulus of the heat-sensitive recording material can be reduced.

The content of hollow plastic particles can be selected from a broad range, and is typically preferably about 2 to 90 mass %, based on the total solids content of the undercoat layer. The content of hollow plastic particles having an average particle diameter of about 5.0 μm or more can be selected from a broad range, and is typically preferably 50 masse or less, more preferably 30 mass or less, and even more preferably 10 to 30 mass, based on the total solids content of the undercoat layer. When the content of hollow plastic particles having an average particle diameter of about 5.0 μm or more is 50 mass % or less, the undercoat layer can have enhanced sensitivity.

When hollow plastic particles having an average particle diameter of 5.0 μm or more are used, the particles are preferably used in combination with hollow plastic particles having an average particle diameter of less than 5.0 μm. The mass ratio of the hollow plastic particles having an average particle diameter of 5.0 μm or more to the hollow plastic particles having an average particle diameter of less than 5.0 μm in the undercoat layer is preferably in the range of 10/50 to 50/10, and more preferably 15/45 to 45/15.

The undercoat layer can also contain an oil-absorbing pigment with an oil absorption of 70 ml/100 g or more, and particularly about 80 to 150 ml/100 g, and/or thermal expansion particles. In particular, containing an oil-absorbing pigment can enhance the effect of inhibiting the adhesion of the residue to a thermal head and is thus preferable. The oil absorption referred to herein is a value determined in accordance with JIS K 5101.

The oil-absorbing pigment may be any of various types of oil-absorbing pigments. Specific examples include inorganic pigments such as calcined kaolin, amorphous silica, light calcium carbonate, and talc. Such oil-absorbing pigments preferably have an average primary particle diameter of about 0.01 to 5 μm, and particularly about 0.02 to 3 μm. The content of the oil-absorbing pigment can be selected from a broad range. In general, the content is preferably about 2 to 95 mass %, and more preferably about 5 to 90 mass %, based on the total solids content of the undercoat layer.

The undercoat layer is formed by mixing and stirring hollow plastic particles, an oil-absorbing pigment, a binder, auxiliary agents, and the like typically using water as a medium to prepare a coating liquid for an undercoat layer, applying the coating liquid to a support, and drying. The amount of the coating liquid for an undercoat layer to be applied is not particularly limited, and preferably about 2 to 20 $g/m^2$, and more preferably about 2 to 12 $g/m^2$ in terms of dry weight.

The binder for use can be suitably selected from binders that can be used in the heat-sensitive recording layer. Examples of binders include oxidized starch, starch-vinyl acetate graft copolymers, carboxymethylated cellulose, polyvinyl alcohols, latexes, and the like. Among these, latexes are particularly preferable. Examples of latexes include, but are not limited to, water-insoluble polymers such as polyvinyl acetate, polyurethane, styrene-butadiene copolymers, styrene-butadiene-acrylonitrile copolymers, acrylonitrile-butadiene copolymers, polyacrylic acid, polyacrylic acid esters, vinyl chloride-vinyl acetate copolymers, polybutyl methacrylate, ethylene-vinyl acetate copolymers, silylated urethane, acrylic-silicon composites, acrylic-silicon-urethane composites, urea resins, melamine resins, amide resins, and polyurethane resins. Among these, a styrene-butadiene copolymer is particularly preferable. The content of the latex can be selected from a broad range, and is typically preferably 10 mass % or more, more preferably 25 mass % or more, and particularly preferably 25 to 40 mass %. When the content of latex is 10 mass % or more, the undercoat layer has enhanced cushioning properties, whereby the elastic modulus of the heat-sensitive recording material can be reduced.

The glass transition temperature (Tg) of the binder (particularly latex) is not particularly limited, and is preferably 5° C. or less, more preferably −10° C. or less, and even more preferably −40 to −20° C. When a binder that has a glass transition temperature of 5° C. or less (particularly latex) is used, the undercoat layer can have further enhanced cushioning properties, whereby the elastic modulus of the heat-sensitive recording material can be reduced. The content of the binder can be selected from a wide range, and is typically preferably about 5 to 40 mass %, based on the total solid content of the undercoat layer.

Heat-Sensitive Recording Layer

The heat-sensitive recording layer of the heat-sensitive recording material of the present invention may contain any of various colorless or pale-colored known leuco dyes. Specific examples of such leuco dyes are described below.

Specific examples of leuco dyes include dyes capable of developing blue color, such as 3,3-bis(p-dimethylaminophenyl)-6-dimethylaminophthalide, 3-(4-diethylamino-2-methylphenyl)-3-(4-dimethylaminophenyl)-6-dimethylaminophthalide, and fluoran; dyes capable of developing green color, such as 3-(N-ethyl-N-p-tolyl)amino-7-N-methylanilinofluoran, 3-diethylamino-7-anilinofluoran, 3-diethylamino-7-dibenzylaminofluoran, and rhodamine B-anilinolactam; dyes capable of developing red color, such as 3,6-bis(diethylamino)fluoran-γ-anilinolactam, 3-cyclohexylamino-6-chlorofluoran, 3-diethylamino-6-methyl-7-chlorofluoran, and 3-diethylamino-7-chlorofluoran; dyes capable of developing black color, such as 3-(N-ethyl-N-isoamyl)amino-6-methyl-7-anilinofluoran, 3-(N-methyl-N-cyclohexyl)amino-6-methyl-7-anilinofluoran, 3-diethylamino-6-methyl-7-anilinofluoran, 3-di(n-butyl)amino-6-methyl-7-anilinofluoran, 3-di(n-pentyl)amino-6-methyl-7-anilinofluoran, 3-(N-ethyl-N-isoamylamino)-6-methyl-7-alininofluoran, 3-diethylamino-7-(m-trifluoromethylanilino)fluoran, 3-(N-isoamyl-N-ethylamino)-7-(o-chloroanilino)fluoran, 3-(N-ethyl-N-2-tetrahydrofurfurylamino)-6-methyl-7-anilinofluoran, 3-(N-n-hexyl-N-ethylamino)-6-methyl-7-anilinofluoran, 3-[N-(3-ethoxypropyl)-N-ethylamino]-6-methyl-7-anilinofluoran, 3-[N-(3-ethoxypropyl)-N-methylamino]-6-methyl-7-anilinofluoran, 3-diethylamino-7-(2-chloroanilino)fluoran, 3-di(n-butylamino)-7-(2-chloroanilino)fluoran, 4,4'-bis-dimethylaminobenzhydrinbenzyl ether, N-2,4,5-trichlorophenylleucooramine, 3-diethylamino-7-butylaminofluoran, 3-ethyl-tolylamino-6-methyl-7-anilinofluoran, 3-cyclohexyl-methylamino-6-methyl-7-anilinofluoran, 3-diethylamino-6-chloro-7-(R-ethoxyethyl)aminofluoran, 3-diethylamino-6-chloro-7-(γ-chloropropyl)aminofluoran, 3-diethylamino-6-methyl-7-anilinofluoran, 3-(N-isoamyl-N-ethylamino)-6-methyl-7-anilinofluoran, 3-dibutylamino-7-chloroanilinofluoran, 3-diethylamino-7-(o-chlorophenylamino)fluoran, 3-(N-ethyl-p-toluidino)-6-methyl-7-anilinofluoran, 3-(N-ethyl-p-toluidino)-6-methyl-7-(p-toluidino)fluoran, 3-(N-ethyl-N-tetrahydrofurfurylamino)-6-methyl-7-anilinofluoran, 3-diethylamino-6-chloro-7-anilinofluoran, 3-dimethylamino-6-methyl-7-anilinofluoran, 3-pyrrolidino-6-methyl-7-anilinofluoran, 3-piperidino-6-methyl-7-anilinofluoran, 2,2-bis{(4-[6'-(N-cyclohexyl-N-methylamino)-3'-methylspiro[phthalide-3,9'-xanthen-2'-ylamino]phenyl)}propane, and 3-diethylamino-7-(3'-trifluoromethylphenyl)aminofluoran; dyes having absorption wavelengths in the near infrared region, such as 3,3-bis[1-(4-methoxyphenyl)-1-(4-dimethylaminophenyl)ethylen-2-yl]-4,5,6,7-tetrachlorophthalide, 3,3-bis[1-(4-methoxyphenyl)-1-(4-pyrrolidinophenyl)ethylen-2-yl]-4,5,6,7-tetrachlorophthalide, 3-p-(p-dimethylaminoanilino)anilino-6-methyl-7-chlorofluoran, 3-p-(p-chloroanilino)anilino-6-methyl-7-chlorofluoran, and 3,6-bis(dimethylamino)fluorene-9-spiro-3'-(6'-dimethylamino)phthalide; and the like. Usable lueco dyes are, of course, not limited to these compounds, and two or more of such compounds can be used in combination as necessary.

The content of the leuco dye is not particularly limited, and is preferably about 3 to 30 mass %, more preferably about 5 to 25 mass %, even more preferably about 7 to 20 mass %, based on the total solids content of the heat-sensitive recording layer. A leuco dye content of 3 mass % or more can enhance color development ability and thus improve print density, whereas a leuco dye content of 30 masse or less can enhance heat resistance.

Specific examples of developers include phenolic compounds such as 4-tert-butylphenol, 4-acetylphenol, 4-tert-octylphenol, 4,4'-sec-butylidenediphenol, 4-phenylphenol, 4,4'-dihydroxydiphenylmethane, 4,4'-isopropylidenediphenol, 4,4'-cyclohexylidenediphenyl, 4,4'-cyclohexylidenediphenol, 1,1-bis(4-hydroxyphenyl)-ethane, 1,1-bis(4-hydroxyphenyl)-1-phenylethane, 4,4'-bis(p-tolylsulfonylaminocarbonylamino)diphenylmethane, 1,1-bis(4-hydroxyphenyl)cyclohexane, 2,2'-bis[4-(4-hydroxyphenyl)phenoxy]diethyl ether, 4,4'-dihydroxydiphenylsulfide, 4,4'-thiobis(3-methyl-6-tert-butylphenol), 4,4'-dihydroxydiphenylsulfone, 2,4'-dihydroxydiphenylsulfone, 2,2-bis(4-hydroxyphenyl)-4-methylpentane, 2,4'-dihydroxydiphenylsulfone, 4-hydroxy-4'-isopropoxydiphenylsulfone, 4-hydroxy-4'-n-propoxydiphenylsulfone, 4-hydroxy-4'-allyloxydiphenylsulfone, 4-hydroxy-4'-benzyloxydiphenylsulfone, 3,3'-diallyl-4,4'-dihydroxydiphenylsulfone, butyl bis(p-hydroxyphenyl)acetate, methyl bis(p-hydroxyphenyl)acetate, hydroquinone monobenzyl ether, bis(3-allyl-4-hydroxyphenyl)sulfone, 4-hydroxy-4'-methyldiphenylsulfone, 4-allyloxy-4'-hydroxydiphenylsulfone, 3,4-dihydroxyphenyl-4'-methylphenylsulfone, 4-hydroxybenzophenone, dimethyl 4-hydroxyphthalate, methyl 4-hydroxybenzoate, propyl 4-hydroxybenzoate, sec-butyl 4-hydroxybenzoate, phenyl 4-hydroxybenzoate, benzyl 4-hydroxybenzoate, 4-hydroxybenzoic acid benzyl ester, tolyl 4-hydroxybenzoate, chlorophenyl 4-hydroxybenzoate, and 4,4'-dihydroxydiphenyl ether; aromatic carboxylic acids such as benzoic acid, p-chlorobenzoic acid, p-tert-butylbenzoic acid, tolylchlorobenzoic acid, terephthalic acid, salicylic acid, 3-tert-butylsalicylic acid, 3-isopropylsalicylic acid, 3-benzylsalicylic acid, 3-(α-methylbenzyl)salicylic acid, 3,5-di-tert-butylsalicylic acid, 4-[2-(p-methoxyphenoxy)ethyloxy]salicylic acid, 4-[3-(p-tolylsulfonyl)propyloxy]salicylic acid, 5-[p-(2-p-methoxyphenoxyethoxy)cumyl]salicylic acid, and zinc 4-[3-(p-tolylsulfonyl)propyloxy]salicylate; salts of these phenolic compounds or aromatic carboxylic acids with, for example, polyvalent metals such as zinc, magnesium, aluminum, calcium, titanium, manganese, tin, and nickel; antipyrine complex of zinc thiocyanate; organic acidic substances such as composite zinc salts of terephthalic aldehyde acid and other aromatic carboxylic acids; urea compounds such as N-p-toluenesulfonyl-N'-3-(p-toluenesulfonyloxy)phenylurea, N-p-toluenesulfonyl-N'-p-butoxycarbonylphenylurea, N-p-tolylsulfonyl-N'-phenylurea, 4,4'-bis(p-toluenesulfonylaminocarbonylamino)diphenylmethane, and 4,4'-bis[(4-methyl-3-phenoxycarbonylaminophenyl)ureido]diphenylsulfone; thiourea compounds such as N,N'-di-m-chlorophenylthiourea; organic compounds having a —$SO_2$NH-bond in the molecule, such as N-(p-toluenesulfonyl)carbamic acid p-cumylphenyl ester, N-(p-toluenesulfonyl)carbamic acid p-benzyloxyphenyl ester, N-[2-(3-phenylureido)phenyl]benzenesulfonamide, and N-(o-toluoyl)-p-toluenesulfoamide; inorganic acidic substances such as activated clay, attapulgite, colloidal silica, and aluminum silicate; and the like.

Other examples include urea urethane derivatives represented by formula (1) below, such as 4,4'-bis[(4-methyl-3-phenoxycarbonylaminophenyl)ureido]diphenylsulfone, 4,4'-bis[(2-methyl-5-phenoxycarbonylaminophenyl)ureidoldiphenylsulfone, and 4-(2-methyl-3-phenoxycarbonylaminophenyl)ureido-4'-(4-methyl-5-phenoxycarbonylaminophenyl)ureidodiphenylsulfone; diphenylsulfone derivatives represented by formula (2) below; and the like. Usable developers are, of course, not limited to these compounds, and two or more of such compounds can be used in combination as necessary.

(1)

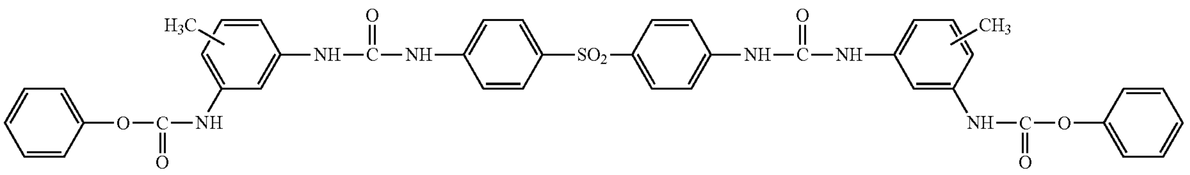

(2)

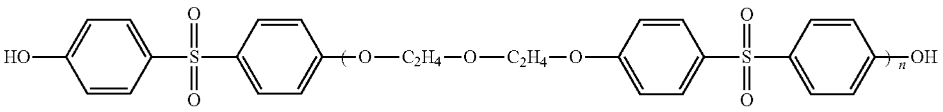

(wherein n represents an integer of 1 to 6).

The developer content is not particularly limited and can be adjusted in accordance with the leuco dye used. The developer content is typically preferably 0.5 parts by mass or more, more preferably 0.8 parts by mass or more, even more preferably 1 part by mass or more, still even more preferably 1.2 parts by mass or more, and particularly preferably 1.5 parts by mass or more, per part by mass of the leuco dye. On the other hand, the developer content is preferably 10 parts by mass or less, more preferably 5 parts by mass or less, even more preferably 4 parts by mass or less, and particularly preferably 3.5 parts by mass or less, per part by mass of the leuco dye. A developer content of 0.5 parts by mass or more can enhance recording performance, whereas a developer content of 10 parts by mass or more can effectively suppress background fogging in a high-temperature environment.

In the present invention, the heat-sensitive recording layer may further contain a stabilizer mainly in order to enhance the preservation of the developed color image. As such a stabilizer, it is possible to use, for example, at least one member selected from the group consisting of phenol compounds such as 1,1,3-tris(2-methyl-4-hydroxy-5-cyclohexylphenyl)butane, 1,1,3-tris(2-methyl-4-hydroxy-5-tert-butylphenyl)butane, 1,1-bis(2-methyl-4-hydroxy-5-tert-butylphenyl)butane, 4,4'-[1,4-phenylenebis(-methylethylidene)]bisphenol, and 4,4'-[1,3-phenylenebis(1-methylethylidene)]bisphenol; epoxy compounds such as 4-benzyloxyphenyl-4'-(2-methyl-2,3-epoxypropyloxy)phenylsulfone, 4-(2-methyl-1,2-epoxyethyl)diphenylsulfone, and 4-(2-ethyl-1,2-epoxyethyl)diphenylsulfone; and isocyanuric acid compounds such as 1,3,5-tris(2,6-dimethylbenzyl-3-hydroxy-4-tert-butyl)isocyanuric acid. Usable stabilizers are, of course, not limited to these compounds, and two or more of such compounds can be used in combination as necessary.

When the stabilizer is used, its amount may be an effective amount for improving image preservation. The stabilizer is typically preferably used in an amount of about 1 to 30 mass, and more preferably about 5 to 20 mass %, based on the total solids content of the heat-sensitive recording layer.

In the present invention, the heat-sensitive recording layer may further contain a sensitizer. Use of the sensitizer enhances the recording sensitivity. Examples of usable sensitizers include stearic acid amide, methoxycarbonyl-N-stearic acid benzamide, N-benzoyl stearic acid amide, N-eicosanoic acid amide, ethylenebisstearic acid amide, behenic acid amide, methylenebisstearic acid amide, N-methylol stearic acid amide, dibenzyl terephthalate, dimethyl terephthalate, dioctyl terephthalate, diphenylsulfone, benzyl p-benzyloxybenzoate, phenyl 1-hydroxy-2-naphthoate, 2-naphthyl benzyl ether, m-terphenyl, p-benzylbiphenyl, oxalic acid-di-p-chlorobenzyl ester, oxalic acid-di-p-methylbenzyl ester, oxalic acid-dibenzyl ester, p-tolyl biphenyl ether, di(p-methoxyphenoxyethyl)ether, 1,2-di(3-methylphenoxy)ethane, 1,2-di(4-methylphenoxy)ethane, 1,2-di (4-methoxyphenoxy) ethane, 1,2-di(4-chlorophenoxy) ethane, 1,2-diphenoxyethane, 1-(4-methoxyphenoxy)-2-(3-methylphenoxy)ethane, p-methylthiophenylbenzylether, 1,4-di(phenylthio)butane, p-acetotoluidide, p-acetophenetidide, N-acetoacetyl-p-toluidine, 1,2-diphenoxymethylbenzene, di(β-biphenylethoxy)benzene, p-di(vinyloxyethoxy) benzene, 1-isopropylphenyl-2-phenylethane, di-o-chlorobenzyl adipate, 1,2-bis(3,4-dimethylphenyl)ethane, 1,3-bis(2-naphthoxy)propane, diphenyl, benzophenone, and the like. These sensitizers can be used in combination as long as the combined use does not impair the effect of the present invention. The sensitizer content may be an effective amount for sensitization, and is typically preferably about 2 to 40 mass % and more, and more preferably about 5 to 25 mass %, based on the total solids content of the heat-sensitive recording layer.

The heat-sensitive recording layer may contain a fine particle pigment having high whiteness and an average particle diameter of 10 μm or less in order to enhance the whiteness of the heat-sensitive recording layer and improve the uniformity of the obtained image. Examples of usable fine particle pigments include inorganic pigments such as calcium carbonate, magnesium carbonate, kaoline, clay, talc, calcined clay, silica, diatomaceous earth, synthetic aluminum silicate, zinc oxide, titanium oxide, aluminium hydroxide, barium sulfate, surface-treated calcium carbonate, and surface-treated silica; and organic pigments such as urea-formalin resin, styrene-methacrylic acid copolymer resin, and polystyrene resin. The fine particle pigment content is preferably an amount that does not reduce the color development density, that is, 50 mass- or less, based on the total solids content of the thermal color development layer.

As other components that constitute the heat-sensitive recording layer, a binder can be used. Further, if necessary, crosslinking agents, waxes, metal soaps, water resistance improving agents, dispersants, colored dyes, fluorescent dyes, and the like can be used.

The binder that is used in the coating liquid for a heat-sensitive recording layer can be any aqueous binder selected from water-soluble binders and water-dispersible binders. Examples of water-soluble binders include polyvinyl alcohol, modified polyvinyl alcohols such as carboxy-modified polyvinyl alcohol, acetoacetyl-modified polyvinyl alcohol, diacetone-modified polyvinyl alcohol, and silicon-modified polyvinyl alcohol; starch and derivatives thereof; cellulose derivatives such as methoxy cellulose, carboxymethyl cellulose, hydroxyethyl cellulose, hydroxypropylmethyl cellulose, methyl cellulose, and ethyl cellulose; sodium polyacrylate, polyvinylpyrrolidone, polyamide, diisobutylene-maleic anhydride copolymer salts, styrene-acrylic acid copolymer salts, styrene-maleic anhydride copolymer salts, ethylene-maleic anhydride copolymer salts, acrylic acid amide-acrylic acid ester copolymers, acrylic acid amide-acrylic acid ester-methacrylic acid copolymers, polyacrylamide, sodium alginate, gelatin, casein, gum arabic, and the like. Examples of water-dispersible binders include latexes of water-insoluble polymers such as polyvinyl acetate, polyurethane, styrene-butadiene copolymers, styrene-butadiene-acrylonitrile copolymers, acrylonitrile-butadiene copolymers, polyacrylic acid, polyacrylic acid esters, vinylchloride-vinylacetate copolymers, polybutyl methacrylate, ethylene-vinylacetate copolymers, silylated urethane, acrylic-silicone composites, acrylic-silicone-urethane composites, urea resins, melamine resins, amide resins, and polyurethane resins. These binders can be used singly, or in a combination of two or more. The heat-sensitive recording layer preferably contains at least one of these binders in an amount of about 5 to 50 mass %, and more preferably about 10 to 40 mass %, based on the total solids content of the heat-sensitive recording layer.

The heat-sensitive recording layer may contain a crosslinking agent that cures a binder in the heat-sensitive recording layer or other layers. This can improve the water resistance of the heat-sensitive recording layer. Examples of crosslinking agents include aldehyde compounds such as glyoxal; polyamine compounds such as polyethyleneimine; epoxy compounds, polyamide resins, melamine resins, glyoxylic acid salts, dimethylolurea compounds, aziridine compounds, block isocyanate compounds; and inorganic compounds such as ammonium persulfate, ferric chloride, magnesium chloride, soda tetraborate, and potassium tetraborate; and boric acid, boric acid triesters, borone polymers, hydrazide compounds, glyoxylic acid salts, and the like. These may be used singly, or in a combination of two or more. The amount of the crosslinking agent used is preferably in the range of about 1 to 10 parts by mass per 100 parts by mass of the total solids content of the heat-sensitive recording layer. This can enhance the water resistance of the heat-sensitive recording layer.

Examples of waxes include waxes such as paraffin wax, carnauba wax, microcrystalline wax, polyolefin wax, and polyethylene wax; higher fatty acid amides such as stearic acid amide and ethylene-bis-stearic acid amide; higher fatty acid esters, and derivatives thereof; and the like.

Examples of metal soaps include higher fatty acid polyvalent metal salts, such as zinc stearate, aluminum stearate, calcium stearate, and zinc oleate. If necessary, various auxiliary agents such as oil repellents, defoaming agents, and viscosity control agents may be added to the heat-sensitive recording layer within a range that does not impair the effect of the present invention.

The heat-sensitive recording layer is formed on the undercoat layer by dispersing a leuco dye and a developer, and if necessary, further a sensitizer and a stabilizer, together or separately, typically using water as a dispersion medium and using at least one of various stirrers or wet pulverizers, such as a ball mill, a co-ball mill, an attritor, or a vertical or horizontal sand mill together with a water-soluble synthetic polymer compound, such as polyacrylamide, polyvinyl pyrrolidone, polyvinyl alcohol, methylcellulose, or a styrene-maleic anhydride copolymer salt, and other additives such as a surfactant to form a dispersion; then using the resulting dispersion having an average particle size of 2 μm or less and optionally further mixing therewith a pigment, a binder, an auxiliary agent, and the like to prepare a coating liquid for a heat-sensitive recording layer; applying the coating liquid for a heat-sensitive recording layer to the undercoat layer and then drying. The coating amount of the heat-sensitive recording layer is not particularly limited and is preferably about 1 to 12 $g/m^2$, more preferably about 2 to 10 $g/m^2$, even more preferably about 2.5 to 8 $g/m^2$, and particularly preferably about 3 to 5.5 $g/m^2$, in terms of the coated amount after drying. Note that the heat-sensitive recording layer may be formed as two or more separate layers if necessary, and the composition and coated amount of each layer may be the same or different.

Protective Layer

The heat-sensitive recording material can comprise a protective layer formed on the heat-sensitive recording layer as necessary. The protective layer preferably contains a pigment and a binder. The protective layer preferably further contains a lubricant, such as polyolefin wax or zinc stearate, for the purpose of preventing the layer from sticking to the thermal head. The protective layer can also contain a UN absorber. When a glossy protective layer is formed, the obtained product can have increased added value.

The binder contained in the protective layer is not particularly limited, and any aqueous binder selected from water-soluble binders and water-dispersible binders can be used. The binder can be appropriately selected from those that can be used for the heat-sensitive recording layer.

The protective layer is formed on the heat-sensitive recording layer by mixing a pigment and a binder optionally with an auxiliary agent and the like typically using water as a dispersion medium to prepare a coating liquid for a protective layer, applying the obtained coating liquid to the heat-sensitive recording layer, and then drying. The coated amount of the coating liquid for a protective layer is not particularly limited and is preferably about 0.3 to 15 $g/m^2$, more preferably about 0.3 to 10 $g/m^2$, even more preferably about 0.5 to 8 $g/m^2$, particularly preferably about 1 to 8 $g/m^2$, and still even more preferably about 1 to 5 $g/m^2$ in terms of dry weight. The protective layer may be formed as two or more separate layers if necessary, and the composition and coated amount of each layer may be the same or different.

Other Layers

In the present invention, in order to increase the added value of the heat-sensitive recording material, the obtained heat-sensitive recording material may be further processed to form a heat-sensitive recording material having higher functionality. For example, adhesive paper, remoistening adhesive paper, or delayed tack paper can be formed by subjecting the back surface of the obtained heat-sensitive recording material to coating with, for example, an adhesive, such as an adhesive, a remoistening adhesive, or a delayed tack adhesive. Recording paper capable of two-sided recording can also be formed by imparting to the back surface of the heat-sensitive material a function as heat transfer paper, ink jet recording paper, carbon-free paper, electrostatic recording paper, or xerography paper. Of course, the heat-sensitive recording material can be formed into a two-side heat-sensitive recording material. A back layer can also be provided to inhibit oil and plasticizer permeation from the back side of the heat-sensitive recording material, or for curl control and antistatic purposes.

The heat-sensitive recording material can also be formed into linerless labels that do not require release paper by forming a silicone-containing release layer on the protective layer and applying an adhesive to the back side.

Heat-Sensitive Recording Material

The elastic modulus of the heat-sensitive recording material of the present invention measured by a nanoindentation method is 200 N/mm$^2$ or less. Due to its elastic modulus of 200 N/mm$^2$ or less, few image defects, clearer printed images, and increased medium energy development density can be achieved. The measurement of the elastic modulus by a nanoindentation method can be performed by a known method, for example, in accordance with the method disclosed in the Examples. The elastic modulus is measured from the outermost surface on the opposite side of the support of the heat-sensitive recording material.

Any known coating method, such as an air knife method, a blade method, a gravure method, a roll coater method, a spray method, a dip method, a bar method, a curtain method, a slot-die method, a slide die method, and an extrusion method, can be used as the method for forming each layer described above on the support. The individual coating liquids may be applied in such a manner that a first coating liquid is applied and dried and then a second coating liquid is applied and dried to form one layer after another, or the same coating liquid may be applied separately to form two or more layers. Further, simultaneous multilayer coating may also be performed in which individual coating liquids are applied all at once to form two or more layers simultaneously. After each layer is formed or in any stage after all layers are formed, the layer may be subjected to a smoothing treatment by a known method, such as supercalendering or soft calendering.

EXAMPLES

The present invention is described below in more detail with reference to Examples. However, the present invention is not limited to these Examples. In the Examples, “parts” and “r” represent “parts by mass” and “percent by mass,” respectively, unless otherwise specified.

Example 1

(1) Preparation of Coating Liquid for Undercoat Layer

A coating liquid for an undercoat layer was prepared by mixing and stirring 154 parts of hollow plastic particles A (trade name: 461WE20, D50: 20 μm, produced by AkzoNobel, solids content: 13.0%), 162 parts of hollow plastic particles B (trade name: Ropaque SN-1055, produced by The Dow Chemical Company, D50: 1.0 μm, solids content: 26.5%), 63 parts of styrene-butadiene latex (trade name: Nalstar SR-116, produced by Nippon A & L Inc., solids content: 50.5%, Tg: −28° C.), and 2 parts of carboxymethyl cellulose (trade name: Cellogen AG gum, produced by DKS Co. Ltd.) were mixed with stirring to obtain a coating liquid for an undercoat layer.

(2) Preparation of Leuco Dye Dispersion (Liquid A)

40 parts of 3-di-(n-butyl)amino-6-methyl-7-anilinofluoran, 40 parts of a 10% aqueous solution of polyvinyl alcohol (degree of polymerization: 500, degree of saponification: 88%), and 20 parts of water were mixed. The resulting mixture was pulverized with a sand mill (produced by Imex Co., Ltd., a sand grinder) to a median diameter of 0.5 μm as measured with a SALD2200 laser diffraction particle size distribution analyzer (produced by Shimadzu Corporation), thus obtaining a leuco dye dispersion (dispersion A).

(3) Preparation of Developer Dispersion (Liquid B-1)

40 parts of 4-hydroxy-4'-isopropoxydiphenyl sulfone (D8 produced by Nippon Soda Co., Ltd.), 40 parts of a 10% aqueous solution of polyvinyl alcohol (degree of polymerization: 500, degree of saponification: 88%), and 20 parts of water were mixed. The resulting mixture was pulverized with a sand mill (produced by Imex Co., Ltd., a sand grinder) to a median diameter of 1.0 μm as measured with a SALD2200 laser diffraction particle size distribution analyzer (produced by Shimadzu Corporation), thus obtaining a developer dispersion (liquid B).

(4) Preparation of Sensitizer Dispersion (Liquid C)

40 parts of oxalic acid di(p-methylbenzyl) ester (trade name: HS-3520, produced by DIC Corporation), 40 parts of a 10% aqueous solution of polyvinyl alcohol (degree of polymerization: 500, degree of saponification: 88.), and 20 parts of water were mixed. The mixture was pulverized with a sand mill (produced by Imex Co., Ltd., a sand grinder) to a median diameter of 1.0 μm as measured with a SALD2200 laser diffraction particle size distribution analyzer (produced by Shimadzu Corporation), thus obtaining a sensitizer dispersion (dispersion C).

(5) Preparation of Coating Liquid for Heat-Sensitive Recording Layer

A composition comprising 29.5 parts of liquid A, 59.1 parts of liquid B, 45.5 parts of liquid C, 45 parts of a 10% aqueous solution of completely saponificated polyvinyl alcohol (product name: PVA110, degree of saponification: 99 mole %, average degree of polymerization: 1000, produced by Kuraray Co., Ltd.), 9.4 parts of a butadiene-based copolymer latex (product name: L-1571, solids content: 48%, produced by Asahi Kasei Corporation), 25.1 parts of light calcium carbonate (trade name: Brilliant-15, produced by Shiraishi Kogyo Co., Ltd.), 11.7 parts of paraffin wax (trade name: Hydrin L-700, produced by Chukyo Yushi Co., Ltd., solids content: 30%), 2 parts of adipic acid dihydrazide (produced by Otsuka Chemical Co., Ltd.), and 120 parts of water was mixed with stirring to obtain a coating liquid for a heat-sensitive recording layer.

(6) Preparation of Coating Composition for Protective Layer

A composition comprising 300 parts of a 10% aqueous solution of acetoacetyl-modified polyvinyl alcohol (trade name: Gosenex Z-200, saponification degree: 99.4 mol %, average degree of polymerization: 1000, modification degree: 5 mol %, produced by The Nippon Synthetic Chemical Industry Co., Ltd.), 63 parts of kaolin (trade name: Hydragloss 90, produced by KaMin LLC), 0.5 part of polyethylene wax (trade name: Chemipearl W-400, produced by Mitsui Chemicals Inc., solids content: 40%), and 114.5 parts of water was mixed with stirring to obtain a coating liquid for a protective layer.

(7) Production of Heat-Sensitive Recording Material

A coating liquid for an undercoat layer, a coating liquid for a heat-sensitive recording layer, and a coating liquid for a protective layer were applied in amounts after drying of 3.0 g/m$^2$, 4.0 g/m$^2$, and 2.0 g/m$^2$, respectively, to one surface of high quality paper having a basis weight of 60 g/m$^2$, and dried to form an undercoat layer, a heat-sensitive recording layer, and a protective layer in this order. The obtained product was then super-calendered to smooth the surface, thus obtaining a heat-sensitive recording material. The proportion of hollow plastic particles having an average particle diameter of 5.0 μm or more in the undercoat layer was 20 mass.

Example 2

A heat-sensitive recording material was obtained in the same manner as in Example 1 except that in the preparation of the coating liquid for an undercoat layer in Example 1, 308 parts of hollow particles A and 87 parts of hollow particles B were used in place of 154 parts of hollow particles A and 162 parts of hollow particles B. The proportion of hollow plastic particles having an average particle diameter of 5.0 μm or more in the undercoat layer was 40 mass-.

Example 3

A heat-sensitive recording material was obtained in the same manner as in Example 1 except that in the preparation of the coating liquid for an undercoat layer in Example 1, 32 parts of styrene-butadiene latex was used in place of 63 parts, and 53 parts of modified starch (trade name: Petrocoat C-8, produced by Nippon Starch Chemical Co., Ltd., solids content: 30%) was added.

Example 4

A heat-sensitive recording material was obtained in the same manner as in Example 1 except that in the preparation of the coating liquid for an undercoat layer in Example 1, 67 parts of L-1571 (trade name, produced by Asahi Kasei Corporation, solids content 48%, Tg: 3° C.) was used in place of 63 parts of the styrene-butadiene latex.

Example 5

A heat-sensitive recording material was obtained in the same manner as in Example 1 except that in the preparation of the coating liquid for an undercoat layer in Example 1, 33 parts of L-1571 (trade name, produced by Asahi Kasei Corporation, solids content 48%, Tg: 3° C.) was used in place of 63 parts of styrene-butadiene latex and 53 parts of modified starch (trade name: Petrocoat C-8, produced by Nippon Starch Chemical Co., Ltd., solids content: 301) was added.

Example 6

A heat-sensitive recording material was obtained in the same manner as in Example 1 except that in the preparation of the coating liquid for an undercoat layer in Example 1, 200 parts of hollow particles C (D50: 7.5 μm, solids content: 10.0%) was used in place of 154 parts of hollow particles A. The proportion of hollow plastic particles having an average particle diameter of 5.0 μm or more in the undercoat layer was 20 mass %.

Example 7

A heat-sensitive recording material was obtained in the same manner as in Example 1 except that in the preparation of the coating liquid for an undercoat layer in Example 1, 485 parts of hollow plastic particles D (trade name: Matsumoto Microsphere F series, produced by Matsumoto Yushi Co., Ltd., D50: 3.5 μm, solids content: 13.0%) were used in place of 154 parts of hollow plastic particles A and the amount of hollow plastic particles B used was changed to 0 parts from 162 parts.

Comparative Example 1

A heat-sensitive recording material was obtained in the same manner as in Example 1 except that in the preparation of the coating liquid for an undercoat layer in Example 1, 154 parts of hollow plastic particles D (trade name: Matsumoto Microsphere F series, produced by Matsumoto Yushi Co., Ltd., D50: 3.5 μm, solids content: 13.0%) were used in place of hollow plastic particles A.

Comparative Example 2

A heat-sensitive recording material was obtained in the same manner as in Example 1 except that in the preparation of the coating liquid for an undercoat layer in Example 1, the amount of hollow plastic particles A used was changed to 0 parts from 154 parts, and 238 parts of hollow plastic particles B were used in place of 162 parts thereof.

The heat-sensitive recording materials prepared in Examples 1 to 7 and Comparative Examples 1 and 2 above were subjected to the following evaluations. Table 1 shows the results.

Elastic Modulus (Nanoindentation Method)

The elastic modulus (unit: $N/mm^2$) was measured under a load of 0.7 mN (indenter: a spherical indenter with φ100 μm, no spring correction, holding time: 1000 msec, number of divisions: 500, step interval: 30 msec, Poisson's ratio: fused quartz: 0.17) using an ENT-2100 nanoindentation system produced by Elionix Inc.

Medium Energy Development Density

An image was recorded on each heat-sensitive recording material at an applied energy of 0.16 mJ/dot in a medium energy range using a thermal recording tester (trade name: TH-PMD, produced by Ohkura Electric Co., Ltd.). The obtained printed portion was measured with a Macbeth densitometer (trade name: RD-914, produced by Macbeth Co., Ltd.) in visual mode. A greater numerical value indicates a higher print density. The recording density is preferably 0.90 or more for practical use.

Saturated Recording Density

An image was recorded on each heat-sensitive recording material at an applied energy of 0.24 mJ/dot in a high energy region using a thermal recording tester (trade name: TH-PMD, produced by Ohkura Electric Co., Ltd.). The obtained printed portion was measured with a Macbeth densitometer (trade name: RD-914, produced by Macbeth Co., Ltd.) in visual mode. A greater numerical value indicates a higher print density. The recording density is preferably 1.30 or more for practical use.

Image Quality

A barcode was recorded using a label printer (trade name: L-2000, produced by Ishida Co., Ltd.). The recorded image quality was visually observed and evaluated according to the following criteria:

A: Almost no image defects are observed, and the recording density is uniform.

B: Image defects are slightly observed.

C: Image defects are observed, and the print density is not uniform, but is practically acceptable.

D: Many image defects are observed, and are problematic in actual use.

TABLE 1

| | Elastic | Recording density | | Image |
|---|---|---|---|---|
| | modulus | 0.16 mJ/dot | 0.24 mJ/dot | quality |
| Example 1 | 124 | 1.15 | 1.38 | A |
| Example 2 | 98 | 1.18 | 1.21 | A |
| Example 3 | 142 | 1.10 | 1.39 | B |
| Example 4 | 155 | 1.05 | 1.37 | B |
| Example 5 | 180 | 0.99 | 1.36 | C |

TABLE 1-continued

| | Elastic | Recording density | | Image |
|---|---|---|---|---|
| | modulus | 0.16 mJ/dot | 0.24 mJ/dot | quality |
| Example 6 | 132 | 1.21 | 1.39 | A |
| Example 7 | 141 | 0.81 | 1.32 | C |
| Comp. Ex. 1 | 312 | 0.74 | 1.34 | D |
| Comp. Ex. 2 | 468 | 0.62 | 1.35 | D |

The invention claimed is:

1. A heat-sensitive recording material comprising an undercoat layer and a heat-sensitive recording layer formed in this order on a support, the undercoat layer containing hollow plastic particles and a binder, the heat-sensitive recording layer containing a leuco dye and a developer, and the heat-sensitive recording material having an elastic modulus of 200 $N/mm^2$ or less as measured by a nanoindentation method, wherein the undercoat layer contains the hollow plastic particles having an average particle diameter of 5.0 μm or more in a proportion of 30 mass % or less, based on the total solids content of the undercoat layer, and the undercoat layer contains a binder having a glass transition temperature of −20° C. or less.

2. The heat-sensitive recording material according to claim 1, wherein the binder in the undercoat layer contains latex.

3. The heat-sensitive recording material according to claim 2, wherein the undercoat layer contains the latex in a proportion of 25 mass % or more, based on the total solids content of the undercoat layer.

* * * * *